(12) United States Patent
Takahashi

(10) Patent No.: US 8,493,508 B2
(45) Date of Patent: Jul. 23, 2013

(54) IMAGE PROCESSOR AND IMAGE PROCESSING METHOD

(75) Inventor: Yukie Takahashi, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 240 days.

(21) Appl. No.: 13/169,973

(22) Filed: Jun. 27, 2011

(65) Prior Publication Data

US 2012/0133826 A1    May 31, 2012

(30) Foreign Application Priority Data

Nov. 30, 2010  (JP) .................................. 2010-267771

(51) Int. Cl.
- *H04N 7/01* (2006.01)
- *H04N 1/04* (2006.01)
- *G09G 5/00* (2006.01)

(52) U.S. Cl.
USPC ............................ 348/441; 345/582; 358/474

(58) Field of Classification Search
None
See application file for complete search history.

(56) References Cited

U.S. PATENT DOCUMENTS

| 2007/0002067 A1* | 1/2007 | Lefebvre et al. ............. 345/582 |
| 2008/0002239 A1* | 1/2008 | Toma et al. ................... 358/474 |

FOREIGN PATENT DOCUMENTS

| JP | 2007-184800 | 7/2007 |
| JP | 2010-009468 | 1/2010 |
| JP | 2010-211300 | 9/2010 |

OTHER PUBLICATIONS

Japanese Patent Application No. 2010-267771; Notice of Rejection; Mailed Sep. 13, 2011 (with English translation).
Saito, Takahiro; "(2) Breaking the Limit of the Sampling Theorem: Super-resolution Oversampling from a Single Image (Technologies Leading to the Next-generation Digital Cameras and Movies)"; The Journal of the Institute of Image Information and Television Engineers; Feb. 1, 2008, vol. 62, No. 2, p. 181-189.
Sakurai, Masaru et al.; "Super Resolution Image Reconstruction utilizing Total Variation Regularization and Learning-based Method"; The Journal of the Institute of Image Information and Television Engineers, Japan, the Institute of Image Information and Television Engineers; Nov. 1, 2012, vol. 64, No. 11, p. 1613-1620.

* cited by examiner

*Primary Examiner* — Jefferey Harold
*Assistant Examiner* — Sean Haiem
(74) *Attorney, Agent, or Firm* — Blakely, Sokoloff, Taylor & Zafman LLP

(57) ABSTRACT

According to one embodiment, an image processor includes a generator, a high-resolution image generator, a separator, a texture generator, and a combiner. The generator compresses an input image to generate a low-resolution image. The high-resolution image generator generates, from the input image, a high-resolution image that is higher in resolution than the input image. The separator separates the low-resolution image generated by the generator into a texture component image and a frame component image. The texture generator generates texture component from the texture component image and the frame component image separated by the separator. The combiner combines the texture component generated by the texture generator with the high-resolution image generated by the high-resolution image generator to generate an output image.

9 Claims, 6 Drawing Sheets

IMAGE PROCESSOR AND IMAGE PROCESSING METHOD

CROSS-REFERENCE TO RELATED APPLICATIONS

This application is based upon and claims the benefit of priority from Japanese Patent Application No. 2010-267771, filed on Nov. 30, 2010, the entire contents of which are incorporated herein by reference.

FIELD

Embodiments described herein relate generally to an image processor and an image processing method.

BACKGROUND

There have been known image processors that perform image processing to generate a high-resolution output image from an input image.

In this type of image processor, image processing is a heavy load and takes a lot of memory.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an image processor comprises a generator, a high-resolution image generator, a separator, a texture generator, and a combiner. The generator is configured to compress an input image to generate a low-resolution image. The high-resolution image generator is configured to generate, from the input image, a high-resolution image that is higher in resolution than the input image. The separator is configured to separate the low-resolution image generated by the generator into a texture component image and a frame component image. The texture generator is configured to generate texture component from the texture component image and the frame component image separated by the separator. The combiner is configured to combine the texture component generated by the texture generator with the high-resolution image generated by the high-resolution image generator to generate an output image.

Exemplary embodiments will be described in detail below with reference to the accompanying drawings.

The image processor of the embodiments is configured to be mounted on an electronic device, and is described herein by way of example as being applied to a television receiver.

Figure 1:
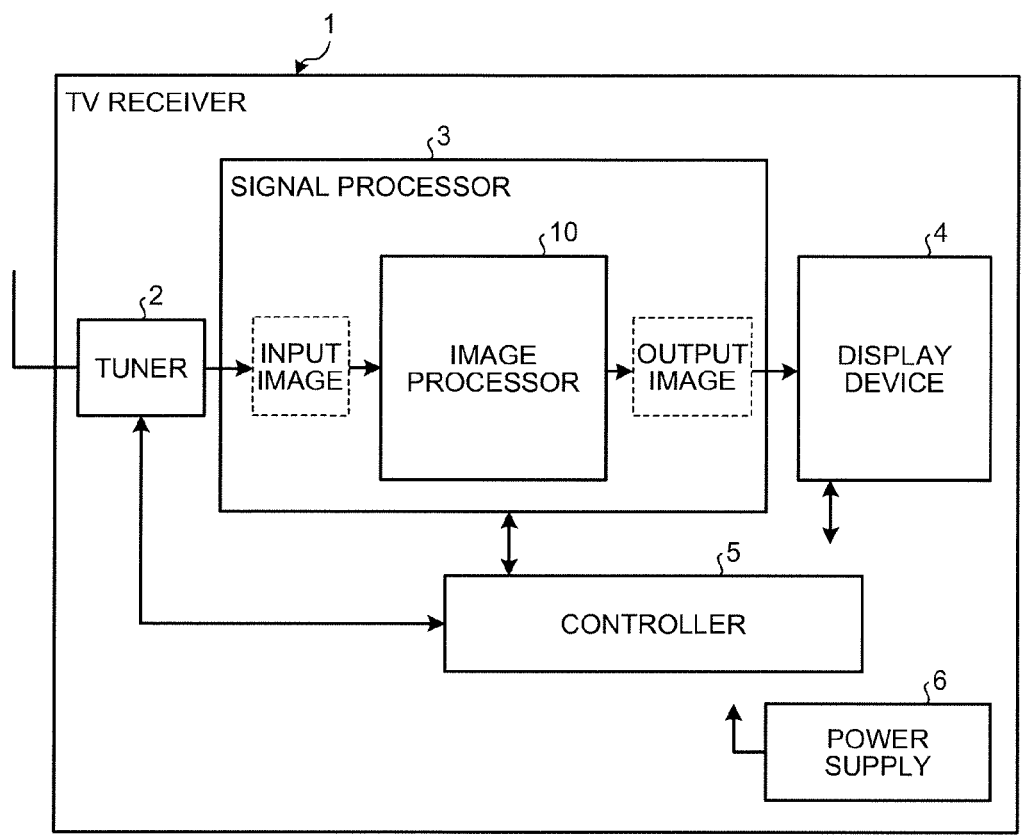
FIG. 1 is an exemplary block diagram schematically illustrating the hardware configuration of a television receiver having an image processor mounted thereon according to a first embodiment.

FIG. 1 is a block diagram schematically illustrating the hardware configuration of a television (TV) receiver 1 having an image processor 10 mounted thereon according to a first embodiment.

As illustrated in FIG. 1, the TV receiver 1 comprises a tuner 2, a signal processor 3, a display device 4, a controller 5, and a power supply 6.

The tuner 2 receives content data from a broadcast station via an antenna, and outputs it to a storage module (not illustrated) and the controller 5.

The signal processor 3 converts content data received from the tuner 2 or an external storage module (not illustrated) into a video signal and an audio signal. The signal processor 3 comprises the image processor 10 and an audio processor (not illustrated). The image processor 10 performs predetermined image processing on the video signal (input image) to generate a high-resolution output image and outputs it to the display device 4. Meanwhile, the audio processor performs predetermined processing on the audio signal and outputs it to a speaker (not illustrated).

The display device 4 displays video. The display device 4 may comprise, for example, a liquid crystal display (LCD).

The controller 5 comprises a central processing unit (CPU), a read only memory (ROM), a random access memory (RAM), and the like. The controller 5 controls the overall operation of the TV receiver 1.

The power supply 6 supplies power from, for example, a commercial power source to each load.

Figure 2:
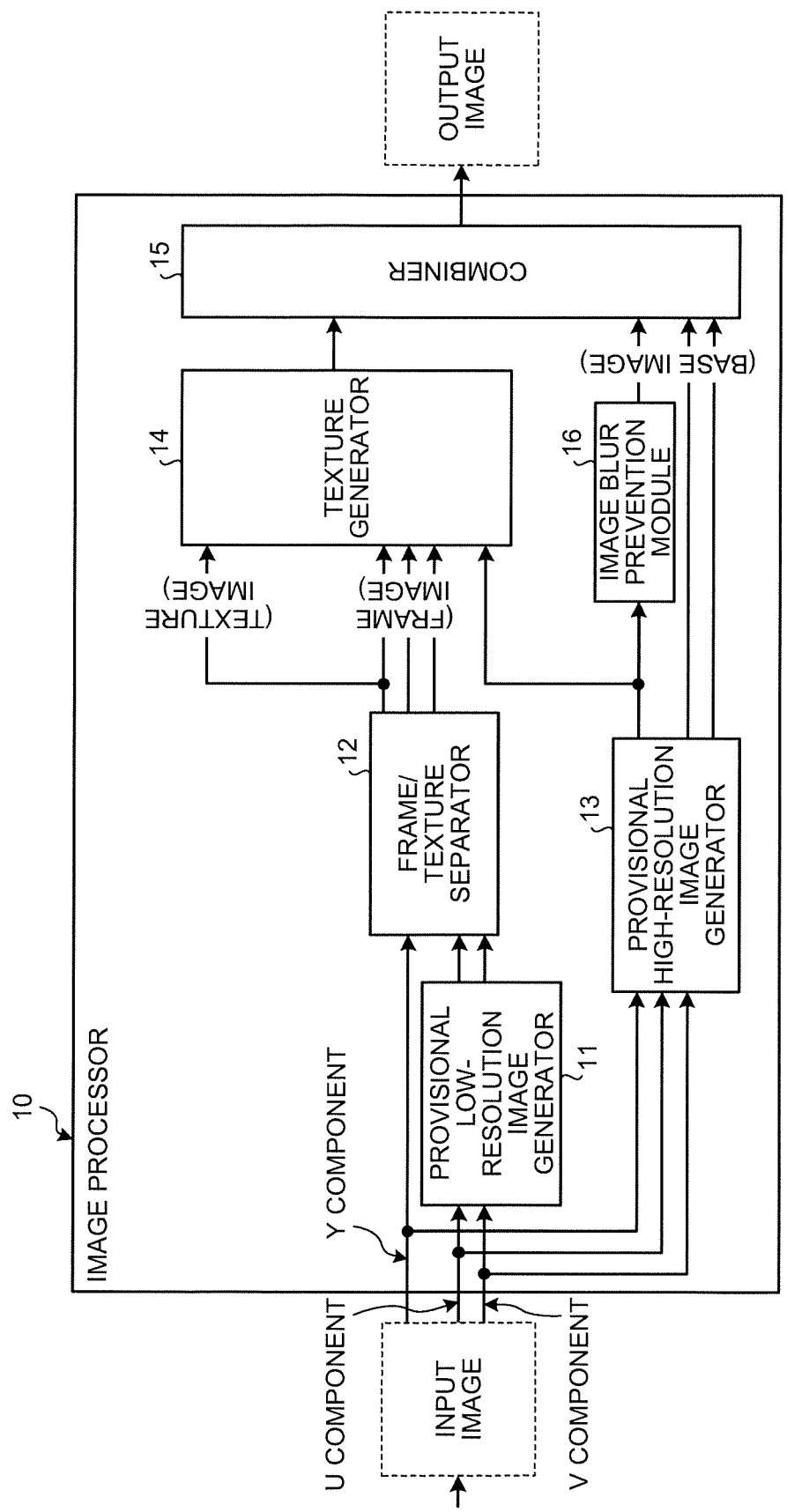
FIG. 2 is an exemplary block diagram of the image processor in the first embodiment.

FIG. 2 is a block diagram of the image processor 10 of the first embodiment.

Roughly, the image processor 10 performs predetermined image processing to add a high-resolution component (texture component) to a provisional high-resolution image (base image) generated from an input image, thereby improving the texture of the image displayed on the display device 4. In the following, an example will be described in which the image processor 10 generates an output image in a different size from a corresponding input image.

As illustrated in FIG. 2, the image processor 10 comprises a provisional low-resolution image generator 11, a frame/texture separator 12, a provisional high-resolution image generator 13, a texture generator 14, a combiner 15, and an image blur prevention module 16.

The provisional low-resolution image generator 11 compresses images of U and V chrominance (hue, color) components except Y luminance (brightness) component of an input image to generate low-resolution images. Examples of the input image include a semi-high definition (HD) image having a resolution of 1440×1080 in YUV420 format and the like.

The frame/texture separator 12 separates each of the provisional low-resolution images of UV (chrominance) components generated by the provisional low-resolution image generator 11 and an image of Y (luminance) component of the input image into a texture component image and a frame component image.

The provisional high-resolution image generator 13 generates a provisional high-resolution image (base image) from the input image. The provisional high-resolution image has a higher resolution than the input image. If the output image is in the same size as the input image, the provisional high-resolution image (base image) is not generated. The provisional high-resolution image generator 13 may comprise, for example, a cubic convolution filter.

The texture generator 14 generates texture component (high-frequency component) to be combined with the provisional high-resolution image generated by the provisional high-resolution image generator 13 from the texture component image of Y component and frame component images of Y, U, and V components separated by the frame/texture separator 12. The texture component to be combined refers to texture component highly similar to a predetermined area (each attention point) of the output image in YUV420 format or the like. The texture generator 14 further receives the provisional high-resolution image of Y (luminance) component generated by the provisional high-resolution image generator 13 to reduce or eliminate noise around the edge.

The combiner 15 combines the texture component generated by the texture generator 14 with the high-resolution image generated by the provisional high-resolution image generator 13, thereby generating an output image in YUV420 format or the like.

The image blur prevention module 16 prevents blur (image blur) in the high-resolution image of Y (luminance) component generated by the provisional high-resolution image generator 13. The image blur prevention module 16 may comprise, for example, an unsharp mask (USM) filter. The valid/invalid is determined by option, and the default may be set to invalid. The image processor 10 need not necessarily comprise the image blur prevention module 16.

The operation of the image processor 10 will be described.

Figure 3:
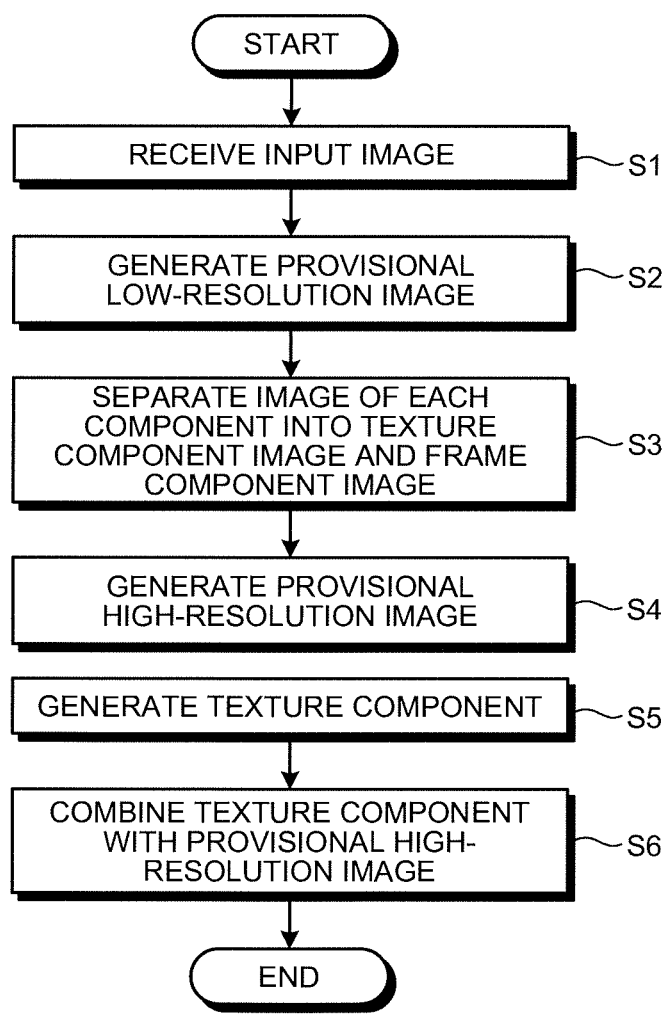
FIG. 3 is an exemplary flowchart of image processing performed by the image processor in the first embodiment.

FIG. 3 is a flowchart of image processing performed by the image processor 10.

As illustrated in FIG. 3, when the image processor 10 receives an input image in YUV420 format or the like (S1), the provisional low-resolution image generator 11 compresses images of UV (chrominance) components of the input image to a predetermined size, thereby generating provisional low-resolution images (S2).

Subsequently, the frame/texture separator 12 separates each of the provisional low-resolution images of UV (chrominance) components generated by the provisional low-resolution image generator 11 and an image of Y (luminance) component of the input image into a texture component image and a frame component image (S3). More specifically, the frame/texture separator 12 first extracts texture component and then generates frame component based on the texture component data.

Next, the provisional high-resolution image generator 13 expands the input image into an output size to generate a provisional high-resolution image (base image) (S4).

After that, the texture generator 14 generates texture component (high-frequency component) highly similar to a predetermined area (each attention point) of the output image in YUV420 format or the like from the texture component image of Y component and frame component images of Y, U, and V components separated by the frame/texture separator 12, and the provisional high-resolution image (base image) of Y (luminance) component received from the provisional high-resolution image generator 13 (S5).

More specifically, at S5, the texture generator 14 detects a texture pattern highly similar to each attention point according to output image size. The texture generator 14 stores the value of texture component corresponding to the detection point as provisional data. To detect a highly similar texture pattern, the texture generator 14 sets a predetermined area (for example, 16×16 pixels) surrounding each attention point in the output image as a search range. From a predetermined area of each search point (for example, 16 pixels) and a predetermined area of each attention point (for example, 16 pixels), the texture generator 14 calculates the average of the sum of absolute differences (SAD) with respect to valid data. The texture generator 14 detects a point where the average is the smallest in the search range as a highly similar texture pattern. In this manner, the texture generator 14 generates provisional data for the entire frame.

Thereafter, the combiner 15 combines the texture component (provisional data) generated by the texture generator 14 with the provisional high-resolution image (base image) of Y (luminance) component generated by the provisional high-resolution image generator 13, thereby generating an output image in YUV420 format or the like, i.e., a high-resolution image with fine texture (S6).

Figure 6:
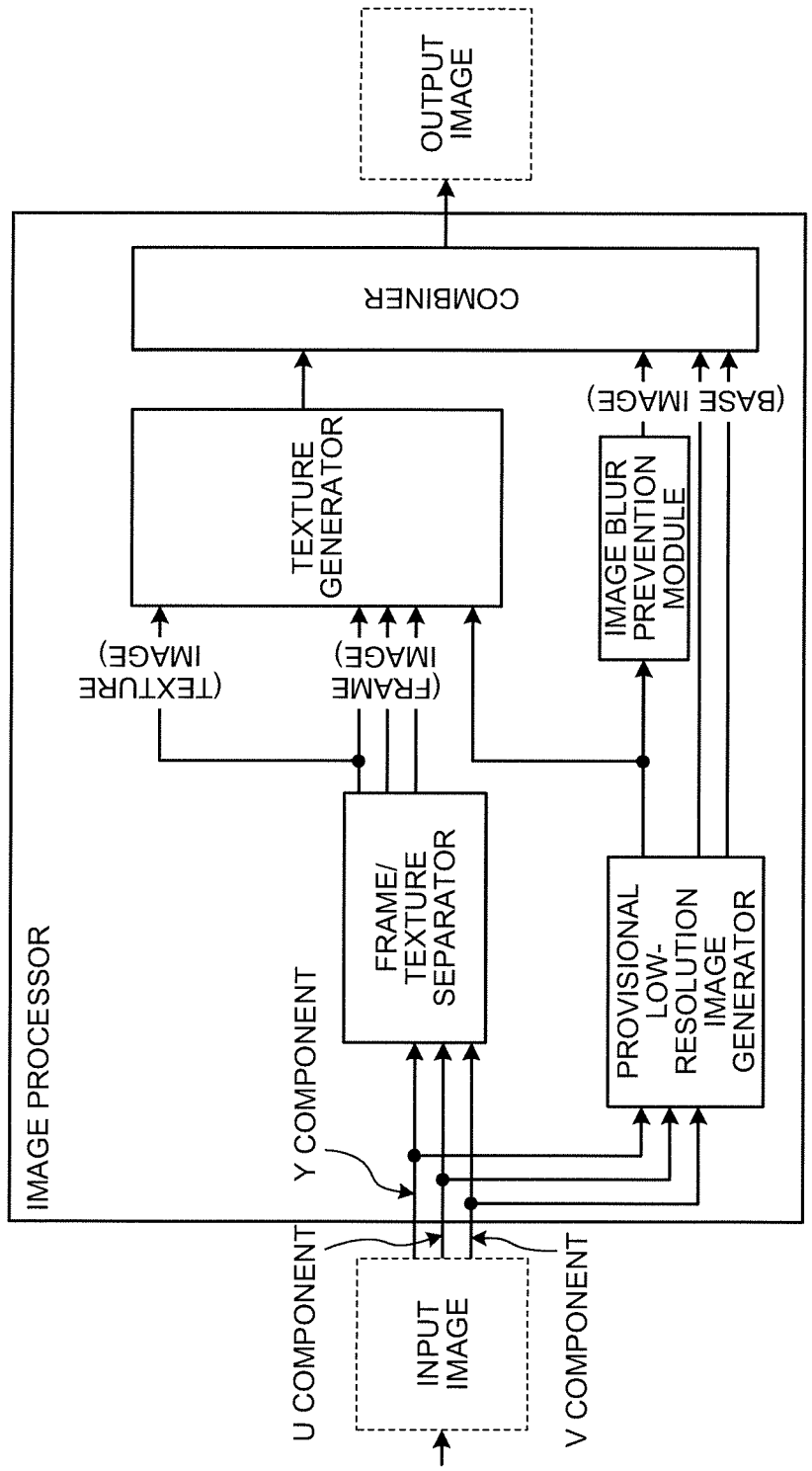
FIG. 6 is an exemplary block diagram of a conventional image processor.

As described above, in the image processor 10 of the first embodiment, an input image is compressed into a low-resolution image and then fed to the frame/texture separator 12. Therefore, compared with a conventional configuration illustrated in FIG. 6, processing load on the frame/texture separator 12 is reduced, which reduces processing load on the entire image processor 10. Moreover, the image processor 10 (for example, the frame/texture separator 12) uses less memory.

According to the first embodiment, the image processor 10 does not compress an image of Y (luminance) component among components of an input image because human visual is sensitive to Y component. The image processor 10 compresses images of only UV (chrominance) components to which human visual is less sensitive, and feeds the images to the frame/texture separator 12. Thus, it is possible to prevent or reduce human-perceptible degradation of image quality.

According to the first embodiment, since processing load on the entire image processor 10 is reduced, it is possible to avoid or reduce unfulfilled conditions (unachieved performance) such as, for example, that 60 frame images cannot be displayed per second on the display device 4 not to make the user feel uncomfortable.

A second embodiment will be described.

Figure 4:
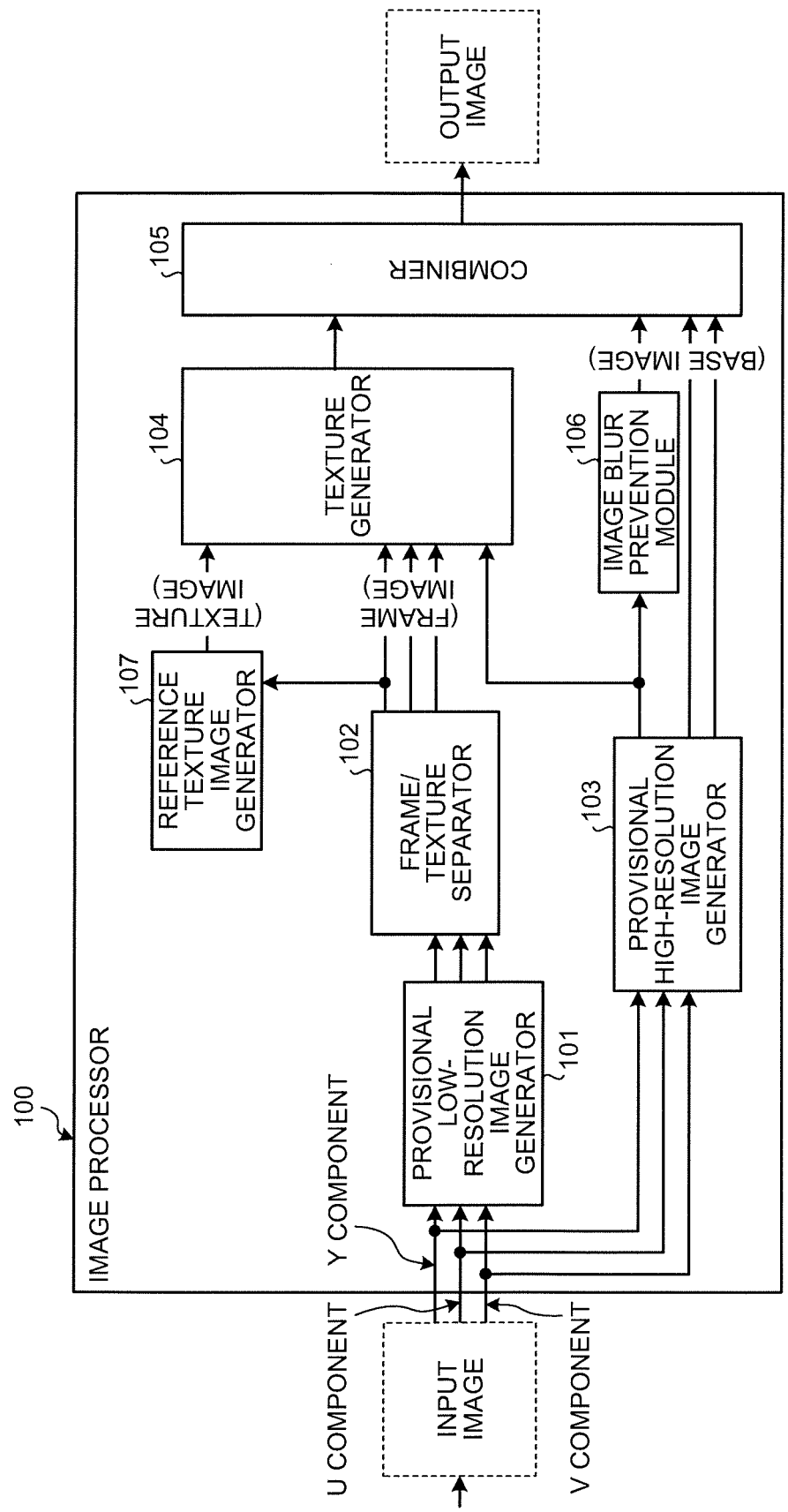
FIG. 4 is an exemplary block diagram of an image processor according to a second embodiment.

FIG. 4 is a block diagram of an image processor 100 according to the second embodiment. The image processor 100 can replace the image processor 10 mounted on the TV receiver 1 illustrated in FIG. 1.

As illustrated in FIG. 4, the image processor 100 comprises a provisional low-resolution image generator 101, a frame/texture separator 102, a provisional high-resolution image generator 103, a texture generator 104, a combiner 105, an image blur prevention module 106, and a reference texture image generator 107.

The image processor 100 is different from the image processor 10 of the first embodiment in that it further comprises the reference texture image generator 107. In addition, the provisional low-resolution image generator 101, the frame/texture separator 102, and the texture generator 104 operate differently from those of the first embodiment. A description will not be given of the same configuration and processing as previously described for the image processor 10 of the first embodiment.

The provisional low-resolution image generator 101 compresses images of respective components (Y, U, and V components) of an input image in YUV420 format or the like to generate low-resolution images. That is, differently from the provisional low-resolution image generator 11, the provisional low-resolution image generator 101 compresses also an image of Y (luminance) component of the input image and generates a low-resolution image.

The frame/texture separator 102 separates each of the provisional low-resolution images of respective components (Y, U, and V components) generated by the provisional low-resolution image generator 101 into a texture component image and a frame component image.

The reference texture image generator 107 expands (restores) the texture component image of a predetermined component, i.e., Y (luminance) component, separated by the frame/texture separator 102 to the input image, thereby generating a reference texture image. The reference texture image generator 107 may comprise, for example, a cubic convolution filter.

The texture generator 104 generates texture component to be combined with the provisional high-resolution image generated by the provisional high-resolution image generator 103 from the reference texture image generated by the reference texture image generator 107 and the frame component images of Y, U, and V components separated by the frame/texture separator 102. As with the texture generator 14 described above, the texture generator 104 further receives the provisional high-resolution image of Y (luminance) component generated by the provisional high-resolution image generator 103 to reduce or eliminate noise around the edge.

The operation of the image processor 100 will be described.

Figure 5:
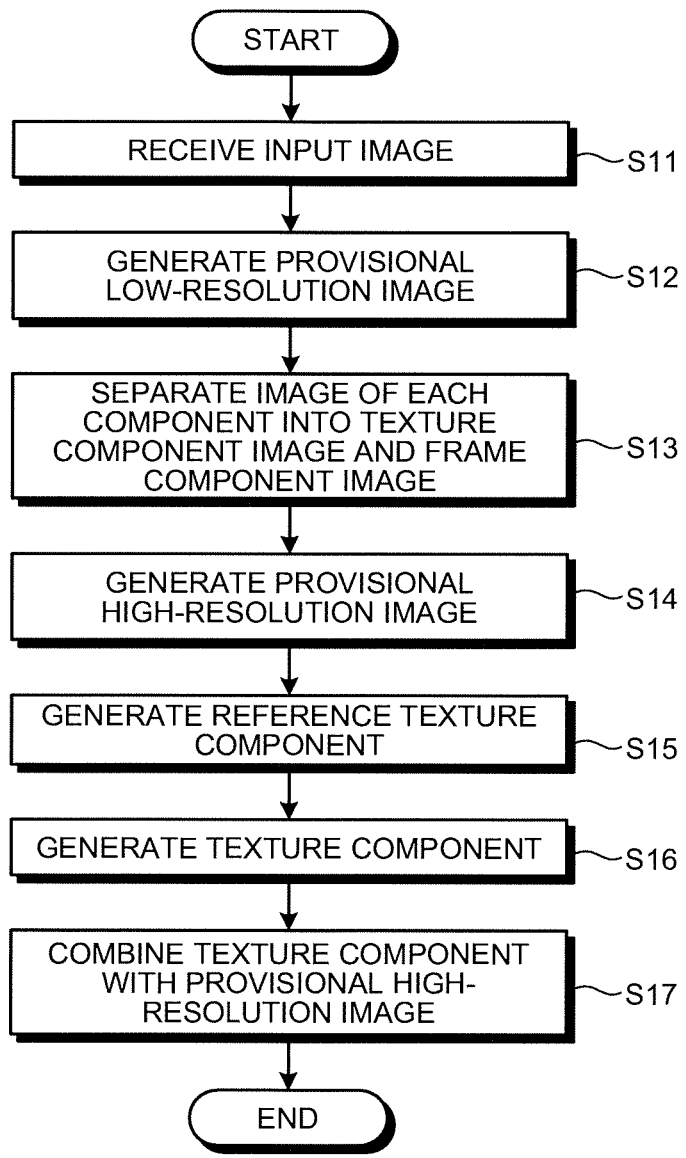
FIG. 5 is an exemplary flowchart of image processing performed by the image processor in the second embodiment.

FIG. 5 is a flowchart of image processing performed by the image processor 100.

As illustrated in FIG. 5, when the image processor 100 receives an input image in YUV420 format or the like (S11), the provisional low-resolution image generator 101 compresses images of respective components (Y, U, and V components) of the input image to a predetermined size, thereby generating provisional low-resolution images (S12).

Subsequently, the frame/texture separator 102 separates each of the provisional low-resolution images of respective components (Y, U, and V components) generated by the provisional low-resolution image generator 101 into a texture component image and a frame component image by extracting texture component as previously described in the first embodiment (S13).

Then, the provisional high-resolution image generator 103 expands the input image into an output size to generate a provisional high-resolution image (base image) (S14).

The reference texture image generator 107 expands (restores) the texture component image of Y (luminance) component separated by the frame/texture separator 102 to the input image, thereby generating a reference texture image (S15).

After that, the texture generator 104 generates texture component highly similar to a predetermined area (each attention point) of the output image in YUV420 format or the like from the reference texture image generated by the reference texture image generator 107 and the frame component images of Y, U, and V components separated by the frame/texture separator 102 (S16). Incidentally, the texture generator 104 detects a highly similar texture pattern in the same manner as previously described in the first embodiment.

Thereafter, the combiner 105 combines the texture component (provisional data) generated by the texture generator 104 with the provisional high-resolution image (base image) of Y (luminance) component generated by the provisional high-resolution image generator 103, thereby generating an output image in YUV420 format or the like, i.e., a high-resolution image with fine texture (S17).

As described above, according to the second embodiment, processing load on the entire image processor 100 can be further reduced compared to the image processor 10 of the first embodiment. Moreover, the image processor 100 uses less memory.

While the image processor 10 (100) is described above as generating an output image in a different size from a corresponding input image, this is by way of example and not limitation. The image processor 10 (100) may generate an output image in the same size as a corresponding input image.

While the image processor 10 (100) is described above as implemented by hardware such as an electronic circuit, this is by way of example and not limitation. Each module of the image processor 10 (100) may be implemented by software.

While a TV receiver is exemplified above as an electronic device where the image processor 10 (100) is mounted, this is by way of example and not limitation. The image processor 10 (100) may be mounted on other electronic devices such as recorders.

The hardware configuration of the TV receiver 1 and the image processor 10 (100), input/output image format, and the like have been described by way of example only and are not limited as described herein.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. an image processor comprising:
   a generator configured to compress an image of chrominance components except luminance component of an input image to generate a low-resolution image; a high-resolution image generator configured to generate, from the input image, a high-resolution image that is higher in resolution than the input image; a separator configured to separate the low-resolution image generated by the generator into a texture component image and a frame component image and to separate the image of luminance component of the input image into a texture component image and a frame component image;
   a texture generator configured to receive the texture component image of luminance component and the frame component images of luminance component and chrominance components separated by the separator, and to generate texture component highly similar to each of attention points of an image to be output; and
   A combiner configured to combine the texture component generated by the texture generator with the high-resolution image generated by the high-resolution image generator to generate an output image.

2. An image processor comprising;
   A generator configured to compress luminance component and chrominance components of an input image to generate low-resolution images;
   A high-resolution image generator configured to generate, from the input image, a high-resolution image that is higher in resolution than the input image;
   a separator configured to separate the low-resolution image of luminance component generated by the generator into a texture component image and a frame component image and separate the low-resolution image of chrominance components generated by the generator into a texture component image and a frame component image;

A reference image generator configured to expand the texture component image of luminance component separated by the separator to generate a reference image, wherein;

a texture generator configured to receive the texture component image of luminance component generated by the reference image generator and the frame component images of luminance component and chrominance components separated by the separator and generate texture component highly similar to each of attention points of an image to be output; and A combiner configured to combine the texture component generated by the texture generator with the high-resolution image generated by the high-resolution image generator to generate an output image.

3. The image processor of claim 1, further comprising a prevention module configured to prevent blur in the high-resolution image generated by the high-resolution image generator, wherein the combiner is configured to combine the texture component with the high-resolution image where blur is prevented by the prevention module.

4. The image processor of claim 1, wherein the image processor is configured to be mounted on an electronic device.

5. The image processor of claim 4, wherein the electronic device is a television receiver.

6. An image processing method comprising:

compressing, by a generator, an image of chrominance components except luminance component of an input image to generate a low-resolution image;

generating, by a high-resolution image generator from the input image, a high-resolution image that is higher in resolution than the input image;

separating, by a separator, the low-resolution image into a texture component image and a frame component image and separating, by the separator, the image of luminance component of the input image into a texture component image and a frame component image;

receiving, by a texture generator, the texture component image of luminance component and the frame component images of luminance component and chrominance components and generating, by the texture generator, texture component highly similar to each of attention points of an image to be output; and combining, by a combiner, the texture component with the high-resolution image to generate an output image.

7. The image processor of claim 2, further comprising a prevention module configured to prevent blur in the high-resolution image generated by the high-resolution image generator, wherein the combiner is configured to combine the texture component with the high-resolution image where blur is prevented by the prevention module.

8. The image processor of claim 2, wherein the image processor is configured to be mounted on an electronic device.

9. The image processor of claim 8, wherein the electronic device is a television receiver.

* * * * *